United States Patent [19]

Buhler et al.

[11] 4,125,527

[45] Nov. 14, 1978

[54] PROCESS FOR THE RECOVERY OF PROTEINS

[75] Inventors: Marcel Buhler, Orbe; Hans-Ueli Bohren, La Tour-de-Peilz; Théodore Hodel, La Tour-de-Peilz; Valentin Wenner, La Tour-de-Peilz, all of Switzerland

[73] Assignee: Societe d'Assistance Technique S.A. pour Produits Nestle, La Tour de Pleilz, Switzerland

[21] Appl. No.: 580,745

[22] Filed: May 27, 1975

Related U.S. Application Data

[62] Division of Ser. No. 491,644, Jul. 25, 1974, Pat. No. 4,018,752.

[30] Foreign Application Priority Data

Jul. 31, 1973 [CH] Switzerland ................... 11117/73
Jun. 7, 1974 [CH] Switzerland ................... 7779/74

[51] Int. Cl.² .............................................. A23J 1/20
[52] U.S. Cl. .............................................. 260/112 R
[58] Field of Search ................................ 260/112 R

[56] References Cited

U.S. PATENT DOCUMENTS

| 3,707,770 | 1/1973 | Timmins et al. | 426/492 |
| 3,814,745 | 6/1974 | Melachouris | 260/112 R |

FOREIGN PATENT DOCUMENTS 2,047,139  4/1971  Fed. Rep. of Germany.
2,219,637  11/1972  Fed. Rep. of Germany.

OTHER PUBLICATIONS

Food Technology, vol. 24, pp. 194–197, McDonough et al., 1970.
J. of Food Science, vol. 36, pp. 14–21, (Fenton–May et al.), 1971.
J. of Food Science, vol. 36, pp. 25–30, (Peri et al.), 1971.
J. of Dairy Science, vol. 54, No. 10, Oct. 1971, McDonough et al., pp. 1406–1409.
Chem. Abstracts, vol. 77, 1972, 46796g, Fenton–May et al.
Chem. Abstracts, vol. 79, 1973, 135417t, Peri et al.
Journal of Food Science, vol. 38, No. 1, Jan. 1973, Peri et al., pp. 135–140.

*Primary Examiner*—Paul R. Michl
*Attorney, Agent, or Firm*—Watson, Leavenworth, Kelton & Taggart

[57] ABSTRACT

A process for isolating a protein fraction from an aqueous solution or suspension containing the said fraction in admixture with other substances, which comprises subjecting the aqueous solution or suspension to ultrafiltration to obtain a retentate, diluting the retentate, subjecting the diluted retentate to at least one further ultrafiltration treatment and recovering a retentate containing the protein fraction.

8 Claims, No Drawings

PROCESS FOR THE RECOVERY OF PROTEINS

CROSS-REFERENCE TO RELATED APPLICATION

This is a divisional application of U.S. application Ser. No. 491,644 filed July 25, 1974, now U.S. Pat. No. 4,018.752.

BACKGROUND OF THE INVENTION

1. Field of the Invention

This invention relates to a process for isolating a protein fraction, to the protein fraction isolated by this process and to the use of the said fraction.

2. Description of the Prior Art

The separation of substances of high molecular weight, such as proteins for example, from substances of low molecular weight, such as salts, sugars, etc., can be carried out satisfactorily in a number of ways, in particular by microbial separation, by chemical separation and by physical separation. The formation of curd in cheese making is the classic example of microbial separation. It involves inter alia a transformation of casein, and leads to the special products which cheeses are. Chemical separation generally necessitates the intervention of third substances which, as a rule, have to be subsequently eliminated and which, in many cases, can only be elimininated with considerable difficulty.

These methods frequently amount to self-developing operations in the sense that, once separation has been initiated, matters follow their course autonomously, and culminate in a specific end product without any opportunity for effective intervention.

Unlike microbial and chemical separation, which often involve a change of phase and/or a change of state, physical separation generally takes place without effecting the proteins in any way. There are at present two forms of physical separation, namely separation on a molecular sieve or separation by ultrafiltration. Except for the adsorption phenomena, molecular-sieve separation, in which a solution containing the proteins is passed through a column filled with a suitable gel, is an operation of the all-or-nothing type, because any substance with molecular dimensions larger than the pores of the sieve is not retained, whilst smaller substances are trapped and blocked. Separation by ultrafiltration is not an instantaneous. Although the substances are distributed progressively on either side of a membrane in dependence upon their molecular dimensions, only substances of small molecular dimensions being able to pass through the membrane, the segregation produced results from a difference in tendency. If in practice it is desired to obtain a product of high concentration, it is necessary to carry out numerous individual separations on as many series-arranged membranes, or to work in a closed loop by recycling. However, polarisation phenomena tend to occur at the membranes, rendering them ineffective. These phenomena are more pronounced, the higher the concentration of the solution being treated. Finally, the viscosity of the product increases with its solids content. This increase in viscosity can only be counteracted with some difficulty by an increase in temperature, a factor to which proteins are extremely sensitive. For these various reasons, it is normally not possible, for example, to prepare by the ultrafiltration of milk an end product whose solids content exceeds approximately 25%, i.e. a protein : lactose ratio of around 3 : 1.

An object of the present invention is to obviate the disadvantages and limitations referred to above.

SUMMARY OF THE INVENTION

The present invention provides a process for isolating a protein fraction from an aqueous solution or suspension containing the said fraction in admixture with other substances, which comprises subjecting the aqueous solution or suspension to ultrafiltration, diluting the retentate of the aqueous solution or suspension, subjecting the diluted retentate to at least one further ultrafiltration treatment, and recovering a retentate containing the protein fraction.

It is clear that this process can be carried out using the cycle of operations defined above once or by repeating it several times.

The invention also relates to the protein fraction thus isolated and to a food product comprising or derived from the said protein fraction.

DESCRIPTION OF THE PREFERRED EMBODIMENTS

In the context of the invention, an aqueous solution or suspension containing a protein fraction in admixture with other substances is a colloidal solution or suspension of lactic proteins, such as whey, colostrum or the milk of a female animal. This milk can be, for example, a fresh milk, a reconstituted milk, for example a milk reconstituted from a powder or concentrated milk, an acidified milk or a milk whose composition has been modified. It can have been subjected to one or more of the pretreatments commonly applied in dairy technology such as, for example, standardization, clarification, homogenization, centrifuging, acidification, pasteurization sterilization (conventional processes, UHT or HTST), concentration.

The aqueous solution or suspension can even be a solution or suspension with a protein : lactose ratio higher than normal (about 0.7 : 1 for a milk and 0.17 : 1 for a whey), for example a milk retentate obtained by ultrafiltration and optionally having been subjected to one or more of the pretreatments referred to above. The aqueous solution or suspension can have a non-fat solids content of, for example, from 5 to 30%. In addition, although the ultrafiltration treatment can be carried out with a whole milk, it is normally preferred to use a skimmed milk in order to avoid over frequent clogging of the membranes. The limit value to be taken into consideration is of the order of 5% of fats.

Finally, another embodiment of the process comprises diluting an ultrafiltration retentate of concentrated whey. The diluent can be either whey or an ultrafiltration permeate.

In the context of the invention, concentrated whey is a whey whose solids content has been increased, irrespective of the means used to achieve this objective. This whey can be concentrated in particular by high-temperature evaporation or by ultrafiltration with or without dilution, or even by a combination of these two techniques.

So far as the whey or dilution permeate is concerned, its concentration, although of an arbitrary nature, will of course be lower than that of the retentate in the course of dilution.

As mentioned above, this particular embodiment enables the retentate to be diluted successively with different diluents, for example dilution with whey followed by dilution with water, or even dilution with a whey whose concentration can, if desired, decrease down to pure water.

According to the invention, an aqueous solution or suspension of proteins is passed through one or more membranes, which may be the same or different so that the proteins are all retained and non-protein substances are not. The working temperature and pressure should be compatible with the mechanical strength of the membranes or membrane-support assemblies. In general, the pressure is in the range from 1 to 60 atms and the temperature in the range from 0° to 70° C. In order not to affect either the interity or the properties of the protein fraction, it is preferred to work at a temperature in the range from 5° to 30° C and under pressures of from 1 to 20 atms.

Dilution of the retentate is generally carried out with water which may be used in a volume of less than, equal to or greater than the volume of the permeate eliminated which can vary in the course of ultrafiltration. Dilution should be carried out at least once. This operation performs a modulating function insofar as it enables the chemical composition of the protein fraction to be regulated with precision. In addition, it is possible to dilute the retentate not only with pure water but also with acidified water or an aqueous solution or even with a succession of different aqueous phases. For example, dilution with a saline solution or with acidified water gives rise to ion exchange in the protein fraction whose salt of $H^+$-ion content will depend inter alia upon the concentration of the dilution solution. In addition, the salt can be a salt already present in the aqueous starting solution or suspension, or a salt which is foreign to it. It is also possible to dilute the retentate with water, acidified water or an aqueous solution to which small quantities of the starting solution or suspension have been added. In addition, if during an ultrafiltration treatment of milk, dilution is carried out with whey or with water, acidified water or an aqueous solution to which whey has been added, the protein fraction obtained is considerably enriched in lactalbumin, which allows a range of dairy products with high casein : lactalbumin ratios to be produced.

In one particular embodiment of the invention, an ultrafiltration retentate enamating from a whey concentrated approximately three times by high-temperature evaporation, and then another three times by ultrafiltration without dilution, is diluted by the addition of ordinary whey. The retentate is rapidly enriched in proteins, whilst its lactose content decreases progressively, and tends towards that of the whey used for dilution. This low content can be reduced even further by terminating ultrafiltration by dilution with water.

The practical application of the process according to the invention involves the use of an ultrafiltration module which, normally, comprises a large number of membranes arranged in series parallel to one another on supports in the form of porous plates arranged adjacent one another at regular intervals, or in the form of tubes arranged in bundles. Such ultrafiltration modules are commercially available to the chemical industry. There are different methods of using these modules. In a first, batch-type method, a batch of aqueous solution or suspension is subjected to ultrafiltration the retentate separately collected and, on completion of the operation, is reintroduced into the ultrafiltration module. These operations are repeated until the retentate or protein fraction has the required composition, dilution being carried out at least once. In another, semi-continuous method, a batch of aqueous solution or suspension is also treated, the difference being that the retentate formed is continuously recycled through the tank which, initially, contained the batch of aqueous starting solution or suspension. In this way, the retentate is initially mixed with the starting material and then with a less concentrated retentate.

Continuous or periodic dilution is carried out in the tank. For a given aqueous solution or suspension of proteins, and all other things being equal, evolution of the compositions as a function of time is preferably determined a single time, so that it is possible during production to obtain a suitable protein fraction simply by virtue of the ultrafiltration time.

Another method use, of commercial interest insofar as it is continuous, is based on the use of a group of identical or different modules arranged in series and comprising as many units as are necessary to obtain the required protein fraction. Dilution has to be carried out at least once, for example between two modules.

In one particular embodiment of the process according to the invention, a pasteurised or sterilised skimmed milk is treated in an ultrafiltration module under a pressure of from 1 to 20 atms, for example under a pressure of 10 atms, at a rate of flow of the permeate of 8 to 16 l/h per $m^2$ of membrane and at a temperature of 5° to 30° C, for example at a temperature of 20° C. This process is of the semi-continuous type defined above. The volume of the suspension in the tank is maintained at a substantially constant level by the addition of water. In another embodiment, dilution during ultrafiltration is only commenced after a certain time interval.

Variants of these two particular embodiments comprise treating a modified milk. For example, it is possible to treat an acidified milk at a pH equal to or above the isoelectric point of casein, generally in the range from 4.6 to 6.0, the milk having been acidified chemically and/or biologically.

By virtue of the process according to the invention, it is possible to obtain protein fractions whose compositions can be modulated and whose characteristic ratios by weight (for example protein : lactose) are spread over a wide continuous spectrum. These protein fractions can be directly used as foods or as ingredients of food compositions, or as starting materials in the production of foodstuffs.

Among these protein fractions, some remarkable individual cases have been selected for illustrative purposes. Thus, it is possible to obtain from milk, protein fractions with protein : lactose ratios in the range from 3 : 1 to 20 : 1. Fractions of this kind, chemically renneted or acidified, coagulate without phase separation and give rise to food-grade gels which can be coloured and/or aromatised as required. If these fractions have been subjected to high-temperature concentration to a suitable solids content, for example 40%, renneting or acidification gives rise to soildification whithout any egress of serum, and products of the cheese type are obtained, which can be subsequently treated as required. If, in addition, dilution is carried out with pure water, the contents of mineral salts, except for the calcium bound partly to the casein, decrease very rapidly. This is the case, for example, with sodium. The simple restitution of lactose to the protein fraction obtained gives rise to the formation of a sodium-free milk of the kind recommended in dietetics. To obtain products of the same kind, but low in calcium, it is sufficient to start with an acidified milk in which some of the calcium, liberated from the casein, is eliminated during ultrafiltration accompanied by dilution.

Milks for human consumption can be prepared by modifying the composition of the starting milks or by carefully selected combinations of the operation described above.

By multiplying the ultrafiltration operations accompanied by dilution, it is possible to obtain from milk fractions with protein : lactose ratios of the order of 200 : 1. By drying at a low temperature (lyophilization), it is possible to recover in dry form all the proteins of the starting solution or suspension. These proteins (casein, lactalbumin, etc.) are of particular interest because they have not undergone any denaturation during their isolation.

The process according to the invention applied to whey makes it possible to recover a neutral or acid protein fraction whose lactalbumin : lactose ratio can be varied as required. Fractions of this kind can be used with particular advantage in the production of high-protein beverages and soups and in the production of special products such as, for example, "humanized" milks.

The advantages of the process according to the invention are embodied in its simplicity and, above all, in the fact that it gives a product whose composition can be modulated individually across a completely continuous range. By adjusting the composition of the aqueous starting solution or suspension, for example by concentration or acidification, followed by dilution of the solution or suspension in the various ways described above, it is possible to obtain a product whose protein : lactose, casein : lactalbumin, calcium : sodium, calcium : casein ratios can themselves be continuously modulated.

In addition, by carrying out dilution with an aqueous volume comparable with that of the permeate eliminated, the solids content of the retentate can be reduced with industrially significant consequences. In this connection, the rate of flow through the membranes increases because the viscosity of the product decreases. Accordingly, there is no need to increase temperature and/or pressure during ultrafiltration with the result that there is no danger of the proteins and/or membranes being altered or of the composition of the two fractions (retentate, permeate) being modified in any way. In addition, the effectiveness of the membranes is affected to a limited extent only, because the polarization layer in the vicinity of the membranes diminishes. Accordingly, washing of the module is particularly easy to the point where there is generally no need to apply enzymatic washing at relatively high cost.

The invention is illustrated by the following Examples, in which ratios and percentages correspond to weight values.

EXAMPLE 1

2,500 liters of skimmed milk, which has been pasteurized and clarified by filtration, are circulated in a DDS ultrafiltration module, type C5-40-28-4-600, consisting of 272 cellulose acetate membranes representing a total surface area of 28 square meters. The pressure on entry is 10 atms and the exit pressure 3 atms. The process is carried out in a closed circuit by means of a tank in which a constant level is maintained by the addition of water. After 9 hours' operation at ambient temperature, a protein fraction identical in volume with the starting milk is collected. 3% of vanilla flavoring, 0.02% of yellow food-grade colorant and 5% of saccharose are added to this protein fraction. After homogenization, 0.03% of 1/10,000 rennet are added, and the product left standing for 3 hours at a temperature of 25° C.

The product obtained is in the form of a very pleasant-tasting gel which can be used as a dessert-type food. Similar gels, but firmer in consistency, can be obtained in the same way from protein fractions prepared in accordance with Examples 2, 3 and 4.

EXAMPLE 2

2400 liters of pasteurized milk are concentrated in an evaporator until a solids content (Sc) of 18% is obtained. This concentrated milk is treated by ultrafiltration as described in Example 1 over a period of 9 hours. The protein fraction obtained is then standardized by the addition of 36% of fats (percentage calculated on the basis of the dry extract), after which the mixture is subjected to pasteurization and homogenization. The product is then concentrated by evaporation in vacuo to a solids content (Sc) of 40 to 50%, after which rennet and lactic ferments are added to obtain a cheese-grade curd which does not have to be drained and which can be directly moulded. This curd constitutes an unripened cheese which can either be consumed as such or which can be subjected to complementary treatments of the kind commonly applied in cheesemaking. Similar product, but of different consistency, can be obtained in the same way from the protein fractions prepared in accordance with Examples 1, 3 and 4.

EXAMPLE 3

1000 liters of skimmed milk are treated by ultrafiltration (UF) as described in Example 1 over a period of 1 hour and 20 minutes without any addition of water. 500 liters of a retentate with a solids content (Sc) of 12.5% and protein : lactose ratio of 1.43 : 1 are obtained. Water is then introduced into the tank in which a constant level is maintained. Ultrafiltration is continued for 6.5 hours, as indicated in Example 1.

EXAMPLE 4

A reconstituted milk is prepared by the addition of 448 liters of water to 67 kg of skimmed milk powder so as to form a milk with a solids content (Sc) of 13%. The 500 liters of milk obtained are treated by ultrafiltration (UF) with dilution over a period of 6 hours in accordance with the method described in Example 1.

EXAMPLE 5

1000 liters of pasteurized skimmed milk are circulated in the ultrafiltration module and under the conditions described in Example 1, the tank being maintained at a constant level by the addition of water. After 6 hours, the retentate obtained has a sodium content of only 0.019% (based on solids) which corresponds to a protein : sodium ratio of 4600 : 1 compared with 78 : 1 for the starting milk. Lactose and oligoelements are added to this product in suitable quantities with a view to preparing a dietetic milk of very low sodium content.

EXAMPLE 6

1000 liters of skimmed milk are treated as described in Example 1, water being added to the tank to keep it at a constant level. After approximately 30 hours' ultrafiltration with dilution, a retentate with a protein : lactose ratio of the order of 200 : 1 is recovered. This product is then concentrated by evaporation in vacuo and dried by lyophilization. Approximately 35 kg of a powder of non-denatured lactic proteins are obtained. This powder can be used for reconstituting milks without lactose intended to replace mother's milk.

EXAMPLE 7

1000 liters of pasteurized milk are inoculated with lactic strains in a concentration of 3°/00. When the pH reaches a value of 5.9, the acidified milk is introduced into an ultrafiltration module under the conditions described in Example 1. During operation acidified water with a pH in the range from 5 to 3 is added in a quantity sufficient to keep the tank at a constant level. After 13 hours' operation, a retentate with a protein : calcium ratio of 73 : 1, compared with 31 : 1 for the starting milk, is recovered. This low-calcium product is used in cheese making.

EXAMPLE 8

15,000 liters of pasteurized whey are treated as described in Example 1, the tank being maintained at a constant level by the addition of water. After 50 hours' ultrafiltration with dilution at ambient temperature, a retentate identical in volume with the starting whey is recovered. The product is pasteurized and then concentrated, after which it is spray-dried at a temperature of 75° C. This temperature, which is the temperature of the air admitted into the drying chamber, corresponds in fact to a temperature of the particles of the order of 50° C. 46% of the dried proteins recovered and 54% of sodium caseinate are then dry-mixed, giving a product rich in soluble proteins with a pH of 6.53 which can be used for correcting the casein : lactalbumin ratio in humanized milks.

EXAMPLE 9

15,000 liters of pasteurized whey are concentrated in an evaporator until a volume equal to one third of the initial volume is obtained. This whey is then treated in the same way as described in Example 1 for a period of 26 hours.

EXAMPLE 10

15,000 liters of pasteurized whey are concentrated in an evaporator until the initial volume has been reduced by half. The 7500 liters of concentrated whey obtained are treated by ultrafiltration (UF) in the apparatus and under the conditions described in Example 1 over a period of 15 hours without any addition of water. 1,500 liters of a retentate with solids content (Sc) of 18.8% and a protein : lactose ratio of 0.72 : 1 are obtained. Water is then introduced into the tank to keep it at a constant level. The treatment is continued for 18 hours as mentioned above.

The main operating parameters, and the characteristics of the various protein fractions obtained in accordance with Examples 1 to 10, are set out in the following Table:

TABLE

| | Starting Product | | | Operating | Protein fraction obtained | |
|---|---|---|---|---|---|---|
| Example | Type & Quantity | Sc % | Protein:Lactose Ratio | Time (hours) | Sc % | Protein:Lactose Ratio |
| 1 | skimmed milk 2500 l | 9 | 0.73/1 | 9 | 4.79 | 3.6/1 |
| 2 | concentrated skimmed milk 1200 l | 18 | 0.64/1 | 9 | 9.20 | 8/1 |
| 3 | skimmed milk retentate 500 l | 12.5 | 1.43/1 | 6.5 | 4.60 | 21/1 |
| 4 | reconstituted milk 500 l | 13 | 0.59/1 | 6 | 3.98 | 18/1 |
| 5 | skimmed milk 1000 l | 9 | 0.73/1 | 6 | n.d | n.d* |
| 6 | skimmed milk 1000 l | 9 | 0.73/1 | 30 | n.d | 200/1 |
| 7 | acidified milk pH 5.9 1000 l | 9 | 0.73/1 | 13 | n.d | n.d** |
| 8 | pasteurised whey 15,000 l | 6 | 0.17/1 | 50 | 4.50 | 16/1 |
| 9 | concentrated whey 5000 l | 18 | 0.18/1 | 26 | 7.27 | 10/1 |
| 10 | retentate of concentrated whey 1500 l | 18.3 | 0.72/1 | 18 | 7.40 | 12/1 | n.d.=not determined
*protein fraction obtained protein : sodium ratio : 4600:1
**protein fraction obtained protein : calcium ratio: 73:1

EXAMPLE 11

9260 liters of whey are concentrated in vacuo until this volume has been reduced to 3087 liters, i.e., to around one third of the initial volume. The concentrated whey, which has a protein : lactose ratio of 0.11, is ultrafiltered as described in Example 1 until a volume of retentate equal to slightly less than one third of the volume of the concentrated whey used is obtained. During this operation, 2161 liters of permeate are eliminated and 926 liters of retentate with a protein : lactose ratio rising to 0.35 are recovered.

Ultrafiltration is continued by keeping the volume of retentate constant by the addition of whey. When this addition reaches 1600 liters, which corresponds to an elimination of 1600 liters of permeate, ultrafiltration is stopped and a final retentate with a protein : lactose ratio of 1 is recovered.

EXAMPLE 12

The process is carried out as described in Example 11 to begin with. Following the addition of 1600 liters of whey, ultrafiltration is continued, and another 200 liters of water are added to replace the same quantity of permeate. The protein fraction recovered at the end of this operation has a protein : lactose ratio rising to 1.1.

We claim:
1. A process for isolating a protein fraction from whey containing the said fraction in admixture with other substances, which comprises subjecting said whey to ultrafiltration to obtain a first retentate and a permeate, diluting said retentate with a volume of whey equal to or greater than that of said permeate, subjecting the diluted retentate to at least one further ultrafiltration treatment and recovering a second retentate containing the protein fraction.

2. A process according to claim 1, wherein the whey has a non-fat solids content of from 5 to 30%.

3. A process according to claim 1, wherein the whey comprises concentrated whey.

4. A process according to claim 1, wherein the ultrafiltration treatments are carried out at a temperature within the range of from 5° to 30° C.

5. A process according to claim 1, wherein the ultrafiltration treatments are carried out under initial pressure from 1 to 20 atmospheres.

6. A process according to claim 1, wherein the first retentate is diluted with whey and then with water.

7. A process according to claim 1, wherein the first retentate is diluted by the addition of a volume of whey substantially equal to the volume of permeate produced during ultrafiltration.

8. A process according to claim 1, wherein the first retentate is diluted by the addition of a volume of whey which is greater than the volume of permeate produced during ultrafiltration.

UNITED STATES PATENT AND TRADEMARK OFFICE
CERTIFICATE OF CORRECTION

PATENT NO. : 4,125,527
DATED : November 14, 1978
INVENTOR(S) : Marcel Buhler, Hans-Ueli Bohren, Theodore Hodel and Valentin Wenner It is certified that error appears in the above-identified patent and that said Letters Patent are hereby corrected as shown below:

On the front page of patent, please change the assignee's name to --Societe d'Assistance Technique Pour Produits Nestle S.A. Lausanne, Switzerland --.

At Col. 1, line 47, "an instantaneous." should read --as instantaneous.--.

At Col. 3, line 12, "interity or the properties" should read --integrity or the properties--.

At Col. 3, line 29, "whose salt of" should read --whose salt or--.

At Col. 4, line 57, "whithout any" should read --without any--.

In the Table at Col. 8, under the heading "Sc %" the last entry "18.3" should read --18.8--. Under the heading "Protein:Lactose Ratio" [the last column of the table], the first entry thereunder "3.6/1" should read --3.5/1--; and the third entry thereunder "21/1" should read --31/1--.

Signed and Sealed this

Fifteenth Day of May 1979

[SEAL]

Attest:

RUTH C. MASON
Attesting Officer

DONALD W. BANNER
Commissioner of Patents and Trademarks